Figure 1:
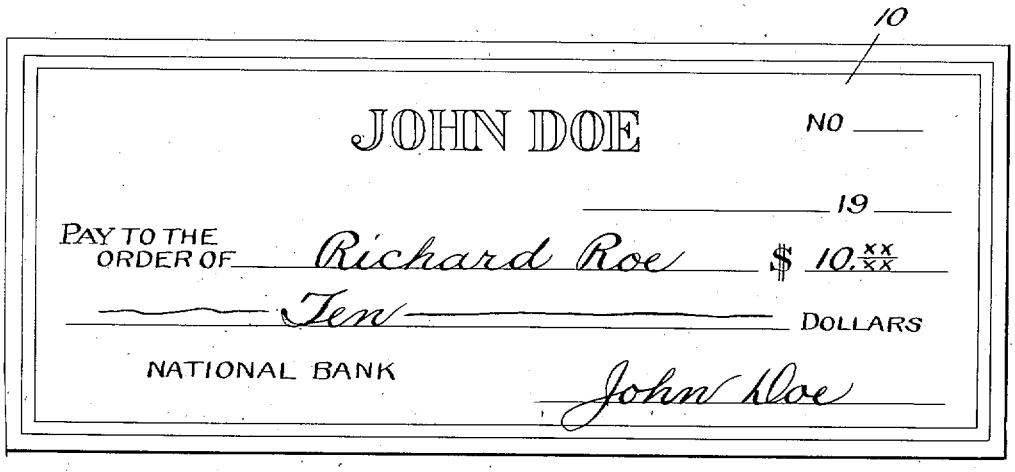

June 24, 1930.

T. J. SNYDER

DOCUMENT PAPER

Re. 17,708

Original Filed July 13, 1926

Inventor
Theodore J. Snyder,
by Bright & Bailey
Attorneys

Reissued June 24, 1930 Re. 17,708

UNITED STATES PATENT OFFICE

THEODORE J. SNYDER, OF CHICAGO, ILLINOIS, ASSIGNOR TO SNYDER DOCUMENT PROTECTION CO., A CORPORATION OF ILLINOIS

DOCUMENT PAPER

Original No. 1,727,912, dated September 10, 1929, Serial No. 122,162, filed July 13, 1926. Application for reissue filed January 23, 1930. Serial No. 422,945.

My invention relates to document paper and is especially useful in connection with those documents whose completion is effected by writing thereon certain necessary data, such as names of individuals, amounts of money, etc.

It is the purpose of my present invention to provide a paper document from which the written portions thereof cannot be removed by erasure or chemical manipulation or both without destroying that portion of the paper which directly carries such writing or so damaging it as to provide a ready means of detecting alterations.

In the preferred embodiment of the invention I form the document of a paper sheet characterized by a body portion of soft texture and of such liquid absorbing qualities that applied writing fluid coming in contact therewith will quickly be absorbed preferably entirely through said body portion. In order to avoid any visible lateral flow of the writing fluid when applied to the document, and in order to secure easy writing action on the document, I provide the face of the body portion upon which writing is to be inscribed with a coating whose liquid absorbing qualities are of sufficiently low value as to visualize no lateral flow of writing fluid when applied thereto and which is sufficiently opaque to shield from view any writing fluid which enters into the body portion through the coating and has a tendency to flow laterally beneath the latter. However, in order that I may effectively provide for entry of writing fluid into the body portion, I construct the coating of such delicate texture that in the operation of writing upon the document the writing implement will slit the coating or sufficiently rupture it to permit the writing fluid, as delivered to the document from the implement, to pass through the opening formed by the slit or rupture into the body portion through which latter it is absorbed in the manner heretofore described. In my experiments I have discovered that casein is adaptable to provide a coating of the texture essential to the proper performance of the functions heretofore referred to. While there is lateral flow of writing fluid entering into the body portion it is not sufficient to destroy the outline of the original writing inscribed upon the document and therefore if well known chemical alteration of the document is resorted to, the writing fluid absorbed by the body portion cannot be entirely eradicated and visible outline of the original writing will remain, thus rendering attempted alteration easily detected. Inasmuch as the writing fluid is absorbed entirely through the body portion mechanical erasure of any kind without detection is rendered exceedingly difficult if not impossible.

My invention also contemplates the use of a paper whose body portion is of such texture that it would not, relatively speaking, come within the commercial definition of "soft" paper, and while possessing liquid absorbing qualities of less value than the softer texture heretofore referred to, they are sufficient to effect in a practical way the carrying out of my invention. In this contemplation of my invention and also where the body portion of the paper is of soft texture as initially referred to, if the writing implement is the ordinary pen two slits will be found in the coating which will produce in conjunction with the body portion two contiguous grooves and the outer limits of these grooves will substantially surround the markings entering into the document. On the other hand if the marking implement embodies only a single coating penetrating portion, such as the type of a writing machine, etc., then only a single slit in the coating and a resulting single groove will be produced and such groove will substantially surround the marking entering into the document.

I am aware that it has heretofore been proposed to construct negotiable documents of a woven fabric material such as cambric into which the writing fluid is adapted to sink. However, in such a construction, in order to prevent visible lateral flow of writing fluid and permit free writing action it is necessary to size and calender the fabric to such an extent that its effective absorbing characteristics are destroyed as far as the use of ordinary commercial ink is concerned and my present invention clearly distinguishes from such an arrangement in that I secure easy writing action without affecting in the least the normal effectiveness of the writing fluid absorbing qualities of the document and in addition requiring no special ink. My invention further distinguishes from the mere use of absorbent paper in constructing such documents in that I eliminate all visible lateral flow of writing fluid.

I will describe my invention as applied to an ordinary bank check, but it will be apparent that the same is applicable to any paper document upon which writing is necessary to effect its completion.

In the drawings chosen to illustrate my invention the scope whereof is set forth in the claims.

Figure 2:
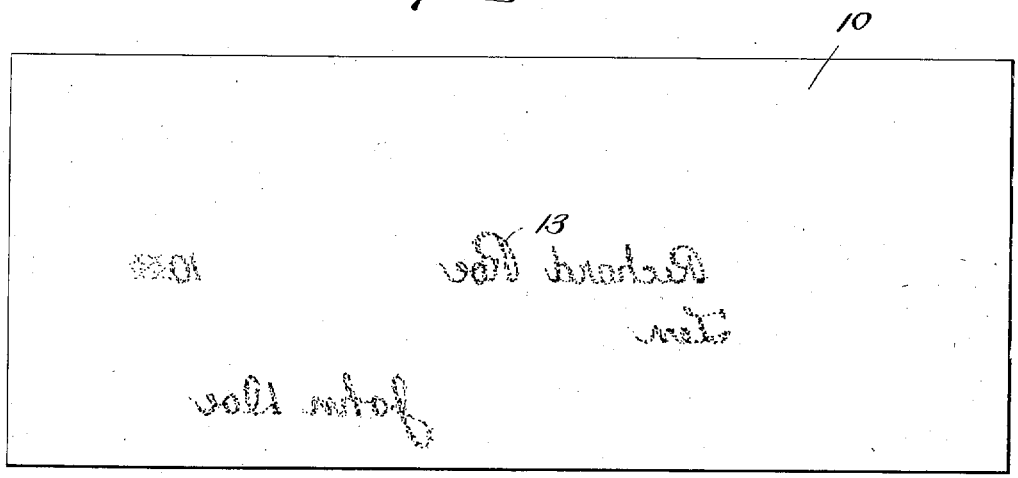

Figure 1 is a face view of a bank check embodying my invention;

Figure 2, a reverse or back view of the check; and

Figure 3:
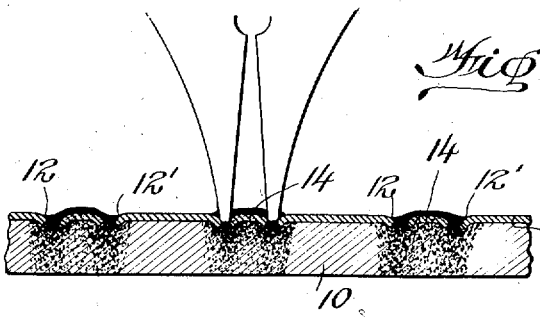

Figure 3, an enlarged sectional view showing certain functions of my invention.

In producing a document, a bank check, for example, in accordance with the preferred embodiment of my invention, I formed the same of a sheet of uncalendered paper characterized by a body portion 10 having liquid absorbing qualities sufficient to cause writing fluid applied to one face to diffuse quickly through to or toward the other face of such portion. On the face of this body portion which receives the printing and written inscription necessary to complete the check, I provide a smooth preferably opaque coating 11, as for instance of casein or similar material which is applied either by dipping the paper in a bath of coating material or by spraying the coating material thereon or in other suitable manner without rolling or in any way calendering or partially calendering the paper. This coating provides for the necessary easy writing action, but is of such delicate texture that the writing implement, such as a pen, will, in performing its usual function, silt or rupture the coating as shown at 12 and 12′ in Fig. 3. Through these slits or ruptures the writing fluid delivered from the pen will pass into contact with the body portion 10 and at once diffuse through the latter to the opposite face as at 13 and also diffuse under the strip 14 of the coating which is located between the slits 12 and 12′. While the writing fluid entering the body 10 will flow laterally to an extent this condition will not be visible through the coating 11 at the outer edges of the slits and as a result the inscription on the check will have the same clear cut appearance as if written on highly sized or calendered non-absorbent paper. Under the conditions specified and illustrated if any attempt is made to chemically eradicate any portion of the writing on the check, it will be found impossible to remove the ink from the texture of the body portion 10 to an extent that will destroy the visible outline of the original writing and furthermore, due to the fact that any chemical employed will sink through the body as soon as it contacts with the letter, it cannot be entirely removed with a blotter, as is customary, permanent discoloration of the document thus resulting which serves as a visible indication of alteration. Should attempt be made mechanically to erase the writing on the check it will result, owing to the complete penetration of ink through the body 10, in perforation of the document or such disfiguration that the attempt at alteration can be detected by the most casual inspection.

The invention is not to be limited to documents formed by writing ink applied by pen, the formation of documents by other means, such as typewriting, being contemplated.

While I have illustrated and described the body portion 10 as having a smooth coating on only one face, it can, if desired, be provided with such coating on both faces.

I claim:

1. A document paper comprising a body portion of sufficiently bibulous texture to permit ink quickly to diffuse therethrough, and a substantially nonabsorbent casein coating on at least one face of said body portion, said casein coating being sufficiently weak in texture to be rupturable throughout its thickness by a writing implement in the normal operation of writing upon the document.

2. A document carrying written characters in ink upon a bibulous absorbent paper base treated with casein, the ink creating said characters being so diffused into the paper that the characters cannot be altered or removed without permanently destroying or disfiguring the said paper.

In testimony whereof I hereunto affix my signature.

THEODORE J. SNYDER.